March 24, 1959 L. R. KAHN 2,879,387

MULTI-CHANNEL PHASE LOCKED TONE CONVERTER

Filed Nov. 25, 1953

5 Sheets-Sheet 1

INVENTOR.
LEONARD R. KAHN
BY Alfred W. Barber
ATTORNEY

March 24, 1959 L. R. KAHN 2,879,387

MULTI-CHANNEL PHASE LOCKED TONE CONVERTER

Filed Nov. 25, 1953 5 Sheets-Sheet 2

INVENTOR.
LEONARD R. KAHN
BY Alfred W. Barber
ATTORNEY

March 24, 1959

L. R. KAHN 2,879,387

MULTI-CHANNEL PHASE LOCKED TONE CONVERTER

Filed Nov. 25, 1953

5 Sheets-Sheet 3

INVENTOR.
LEONARD R. KAHN
BY Alfred W. Barber
ATTORNEY

INVENTOR.
LEONARD R. KAHN
BY Alfred W. Barber
ATTORNEY

March 24, 1959 L. R. KAHN 2,879,387

MULTI-CHANNEL PHASE LOCKED TONE CONVERTER

Filed Nov. 25, 1953 5 Sheets-Sheet 5

INVENTOR.
LEONARD R. KAHN
BY Alfred W. Barber
ATTORNEY

United States Patent Office 2,879,387

Patented Mar. 24, 1959

2,879,387

MULTI-CHANNEL PHASE LOCKED TONE CONVERTER

Leonard R. Kahn, New York, N.Y.

Application November 25, 1953, Serial No. 394,275

9 Claims. (Cl. 250—36)

The present invention concerns tone generators and, in particular, keyed tone generators for use in communications systems.

In radio communication it is common practice to transmit a plurality of keyed tones around a common carrier. It is also common practice to introduce the intelligence to be conveyed in the form of a frequency shift of the tones. The usual method of generating the tones is by the use of a plurality of tone generators capable of being shifted in frequency in response to a keying signal. With this usual type of tone generation and tone shifting, two major problems arise. The first problem is that of stability since if there is any drift in the frequency of any of the tone generators the separation between tones changes causes difficulties in the over all systems operation. Also, since there is no fixed phase relationship between the generated tones, the peak or crest factor of the modulated wave varies at random and the system is limited by being forced to accept the worst condition of peak or crest factor which may arise.

According to the present invention a single tone generator is utilized to generate all the required tones. The frequency of this generator can be equal to or less than the minimum desired frequency difference between any two shifted tones. The various desired tones are generated by generating and combining in various ways the harmonics of the single generated tone. By using a very stable tone generator for the single source all the resulting tones will be highly accurate as to frequency. Since a single tone source is used, the difference frequencies will all be exact multiples of the source frequency. Furthermore, the plase relations between the various tones will be determined by circuit constants and may be accurately controlled. By predetermining the phase relations the peak or crest factors of the resulting signals may be kept at a minimum and considerable power gain in the system may be realized. Where the transmission consists in shifting frequency between two predetermined frequencies, key-clicks and spurious components can be eliminated by shaping the output by means of a band-pass filter. In order to provide for a smooth transition from one frequency to the other without the introduction of transients, the phase and attenuation characteristics of such a band-pass filter must meet certain requirements. For example, the phase characteristic of the filter must be linear enough so that the transient response is kept to a satisfactory low level. What constitutes a satisfactory level depends upon the service requirements of the equipment. In a multiple channel single side-band commercial transmitter the spurious and transient responses must be kept very low.

Accordingly it is one object of the present invention to provide a source of frequency shift tones in which the frequency of each tone bears a fixed relation to all the other tones.

Another object is to provide a source of frequency shift tones bearing predetermined phase relationship.

Another object is to generate a group of "mark" frequencies and a second group of "space" frequencies and to switch to one or the other of these groups.

A further object is to provide a frequency shift tone keyer which yields a complex tone output having a minimized peak or crest factor.

A still further object is to provide a keyed, frequency shifted tone which is shaped after keying.

Still another object is to provide a frequency shift tone source in which a large number of tone combinations is made available.

These and other objects will be apparent from the detailed description of a typical form of the invention given in connection with the various figures of the drawing.

Figure 1:
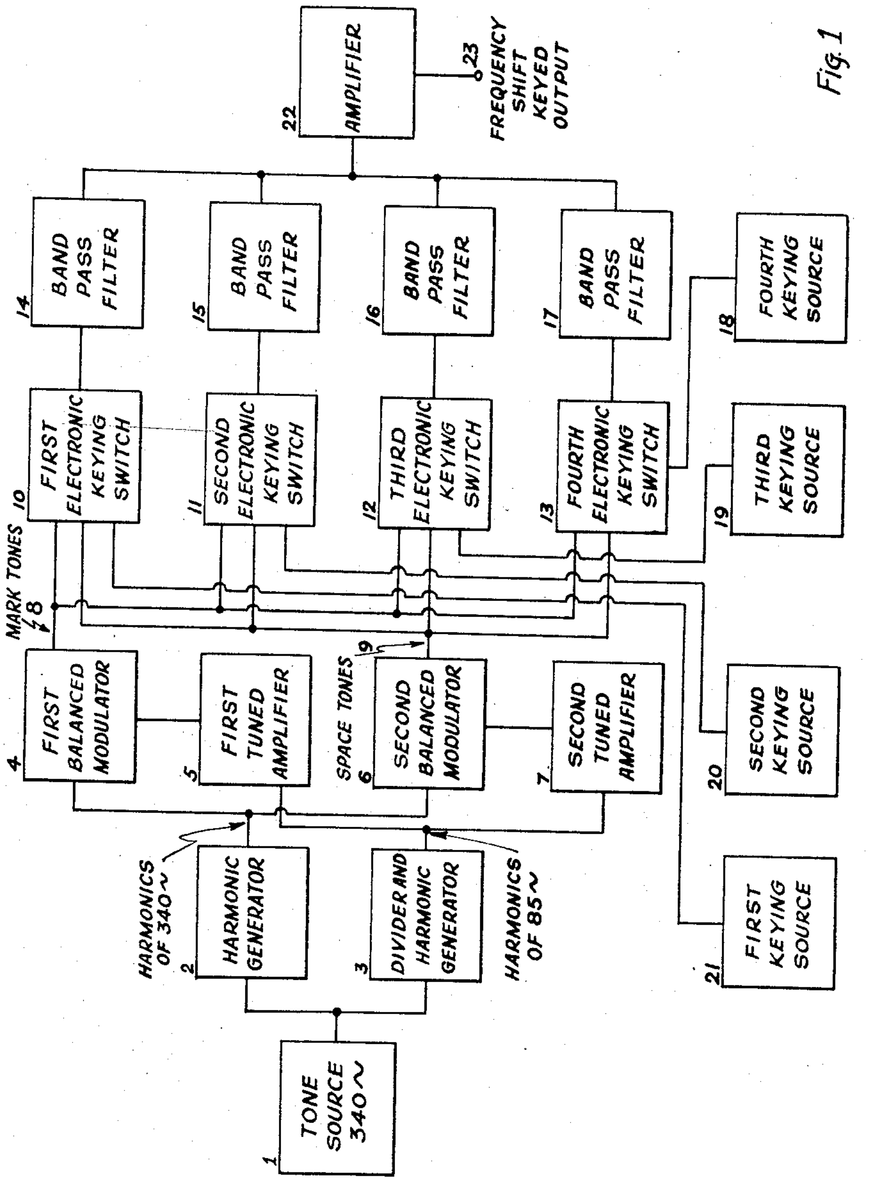
Fig. 1 shows one form of the present invention in block diagram form.

In Fig. 1 is shown a tone source 1 which, for example, may be a source of a 340 cycle signal. This 340 cycle signal is applied to the first harmonic generator 2 and the divider and second harmonic generator 3. The first harmonic generator 2 provides a suitable series of tones as, for example, 340 cycles and its harmonics 680, 1020, 1360, etc. which are applied to balanced modulators 4 and 6. The divider and second harmonic generator 3 provides harmonics of 85 cycles which are applied to first tuned amplifier 5 which selects and amplifies 1445 cycles the 17th harmonic, and to the second tuned amplifier 7 which selects and amplifies 1615 cycles the 19th harmonic of 85 cycles. The selected and amplified 1445 cycle tone is applied to the first balanced modulator 4 where it combines with the 340 cycle tone harmonics to provide a series of tones spaced 340 cycles apart, for example, 425, 765, 1105, 1445, 1785 and 2125 cycle tones. This series of tones will be called the "Mark" tones and they are applied in parallel to the mark tone input circuits of electronic keying switches 10, 11, 12, and 13. Similarly, the selected and amplified 1615 cycle tone is applied to the second balanced modulator 6 where it combines with the 340 cycle tone harmonics to provide a series of tones spaced 340 cycles apart, for example, 595, 935, 1275, 1615, 1955 and 2295 cycle tones. This second series of tones will be called the "Space" tones and they are applied in parallel to the space tone input circuits of electronic keying switches 10, 11, 12 and 13.

The function of the electronic keying switches 10, 11, 12 and 13 is to provide either a mark or a space tone output in response to the on or off condition of the controlling keying sources 21, 20, 19 and 18 respectively. In other words, when the first keying source 21 is at on condition, mark tones appear at the output of electronic keying switch 10 and when source 21 is at off condition, space tones appear at the output of switch 10. As has been set forth above the mark and space tones are groups of tones, so in order to produce only a single tone on mark and a second single tone on space, a band-pass filter 14 which is designed to pass only the two desired tones is connected to the output of switch 10. For example, a band-pass filter passing frequencies from about 400 to 600 cycles will pass 425, a mark tone, and pass 595, a space tone and none of the other tones. Thus, while the input mark and space tones are all applied together, only the desired one of each is derived in the output by means of a band-pass filter. It should be seen at this point that the band-pass filter in the electronic keying switch output entirely controls the shape, build-up, etc. of the keyed output tones. Key-clicks and other spurious signals which are present or are generated by the keying and switching process are controlled in any desired manner by choosing the proper characteristic of the band-pass filter 14. In a similar manner filter 15 selects, say 765 and 935 cycles, filter 16 selects, say 1105 and 1275 cycles and filter 17 selects, say 2125 and 2295 cycles. It will be noted that the difference between the mark and space tones is always 170 cycles. By suitable choice of tones, almost any desired mark and space tones may be generated. In the above example the difference between the mark and space frequencies is twice the frequency of the lowest frequency in the system, that is twice 85 or 170 cycles. The difference between any given mark or space frequency and the next nearest space or mark frequency is likewise 170 cycles. Since all the final mark and space tones are harmonically related to the frequency of the tone source, all difference frequencies are also harmonically related. Also since all frequencies are derived from a single initial source, the phase relations between the various tones will be determined by passive circuit elements and can be predetermined by the circuit constants and adjustment.

The keyed frequency shift tones appearing at the outputs of band-pass filters 14, 15, 16 and 17 may be utilized in any desired manner as for instance, by combining them in amplifier 22 and thus transmitting them to an output point 23 for any desired utilization.

Figure 2:
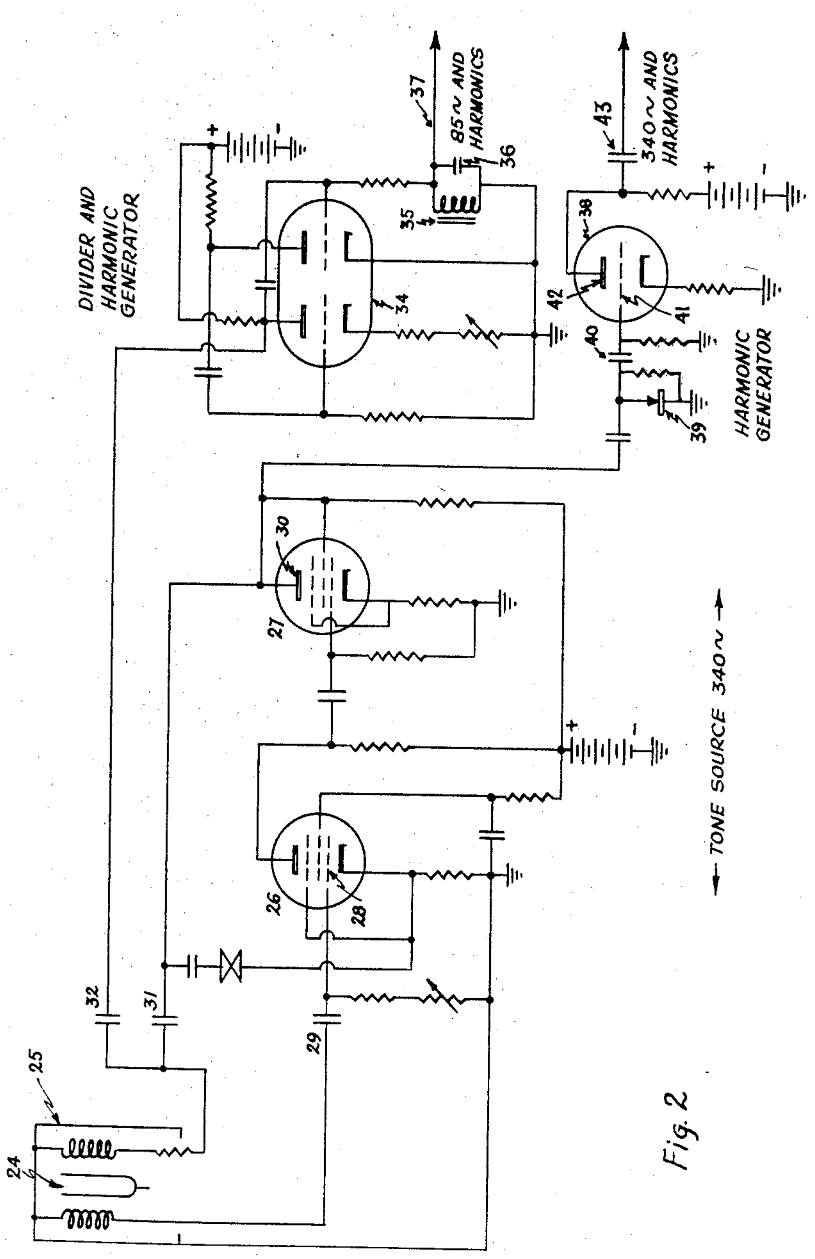
Fig. 2 shows one form of tone source and harmonic generators which may be utilized in the present invention.

Fig. 2 shows circuit details of a tone source and harmonic generators suitable for use in the present invention. The tone source includes tuning fork 24 mounted in case 25. The tuning fork is made to oscillate by means of a two stage amplifier utilizing tubes 26 and 27. Grid 28 of tube 26 is coupled to the tuning fork circuit through coupling capacitor 29 and the amplified currents are fed back to tuning fork 24 from plate 30 through coupling capacitor 31. While not intended to limit the frequency the tuning fork in the example being described oscillates at 340 cycles.

The first harmonic generator and divider (see block 3 in Fig. 1) may be any suitable harmonic generator providing 85 cycles and its harmonics such as multivibrator 34 having tuned elements 35—36 resonating at 85 cycles, coupled to tuning fork 24 through capacitor 32 and providing 85 cycles and harmonics of 85 cycles over output lead 37 for further utilization.

The second harmonic generator is any suitable harmonic generator (see block 2 in Fig. 1) providing harmonics of 340 cycles such as rectifier 39 receiving 340 cycle currents from plate 30 and passing on the rectified 340 cycle signal rich in harmonics to amplifier tube 38 through coupling capacitor 40. The 340 cycle signal and harmonics thus applied to grid 41 appear in amplified form at plate 42 and are fed out through coupling capacitor 43 for further utilization.

Figure 3:
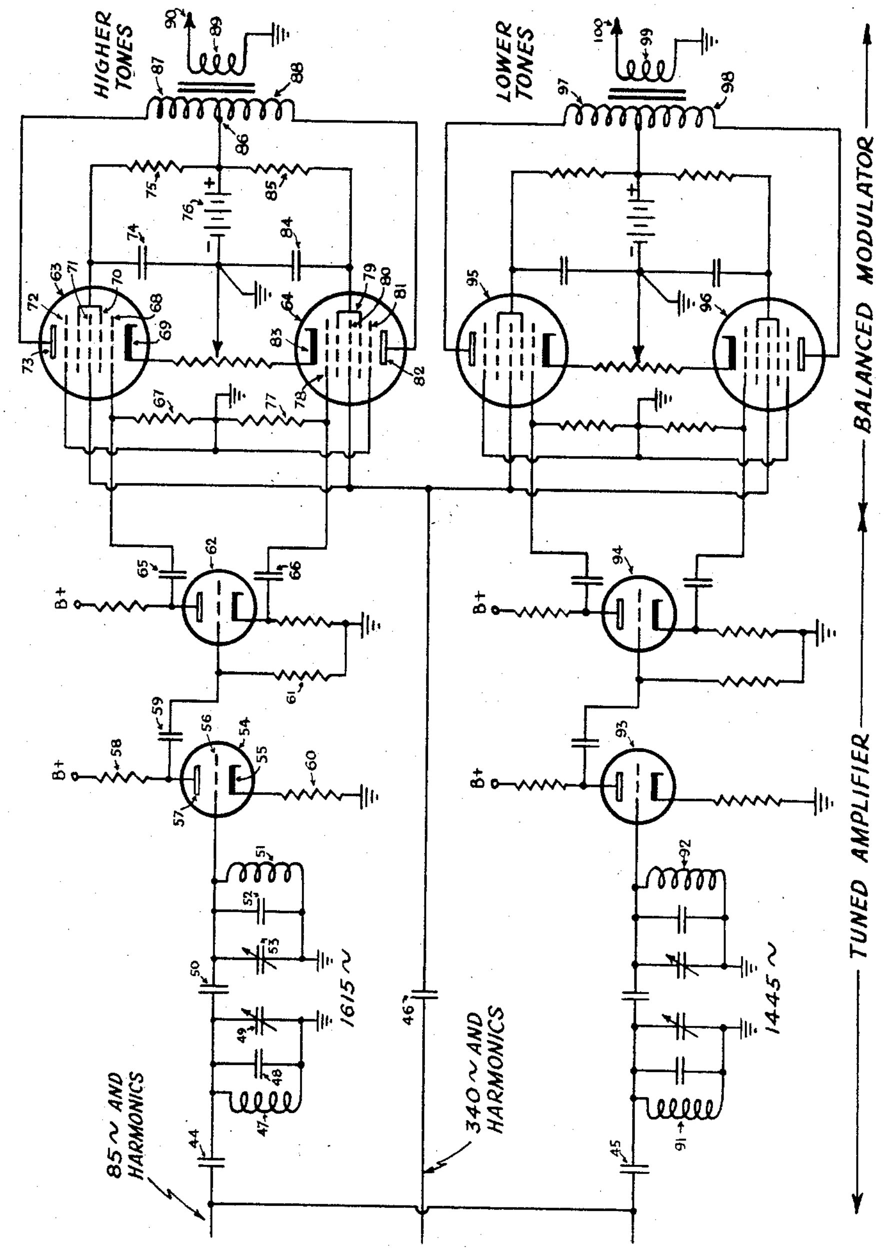
Fig. 3 shows one form of tuned amplifier and balanced modulator which may be utilized in the present invention.

Fig. 3 shows circuits for tuned amplifiers and balanced modulators suitable for use in the present invention. The signal containing 85 cycles and harmonics of 85 cycles is applied to selective circuits through capacitor 44. In the present example the 19th harmonic of 85 cycles or 1615 cycles is selected by two tuned coupled circuits. One of these circuits consists of inductor 47 tuned by fixed capacitor 48 and adjustable capacitor 49. The other consists of inductor 51 tuned by fixed capacitor 52 and adjustable capacitor 53. The two tuned circuits are coupled by means of the high-side coupling capacitor 50 so chosen as to give approximately critical coupling. The selected 1615 cycle signal is amplified by tubes 54 and 62. Tube 54 includes a cathode 55 heated by conventional means, not shown, and connected to a self-bias resistor 60. Grid 56 receives the 1615 cycle signal from coil 51 and the amplified signal appears at plate 57 across plate load resistor 58. The amplified signal is applied to the second amplifier stage 62 through coupling capacitor 59 and across grid resistor 61. A balanced output is obtained through capacitor 65 connected to the plate of tube 62 and capacitor 66 connected to its cathode. The balanced output is applied to control grids 68 and 73 of balanced modulator tubes 63 and 64 and across grid resistors 67 and 77. Balanced modulator 63 includes cathode 69 heated by conventional means, not shown, control grid 68, screen grid 70, second control grid 71, suppressor grid 72 and plate 73. Balanced modulator 64 includes cathode 83, control grid 78, screen grid 79, second control grid 80, suppressor grid 81 and plate 82. Screens 70 and 79 receive bias from voltage source 76 through resistors 75 and 85 and are by-passed by capacitors 74 and 84 respectively. The 340 cycle and 340 cycle harmonics signal is applied to grids 71 and 80 through capacitor 46. The sum and difference frequencies of 1615 cycles with 340, 680, 1020, etc. appear at the plates of modulators 63 and 64 and across output transformer 86—87—88 which supplies the "higher tones" output across secondary 89 to lead 90 going to further utilization means. It will be seen that the tones thus produced are 1615, 1275, 1955, 935, 2295, 595, etc. These tones are utilized in the system, for example, as the "Mark" tones of a frequency shifted signal.

In a similar manner the 1445 cycle tone is selected from the harmonics of 85 cycles by means of tuned circuits 91 and 92 which receive their input through coupling capacitor 45. The 1445 cycle tone thus selected is amplified by thermionic vacuum tubes 93 and 94. This selected 1445 cycle tone is mixed with the 340 cycle and harmonics signal in balanced modulater 95—96 and an output is provided in output transformer 97—98—99 to output lead 100 consisting in a series of "lower tones" 2125, 1785, 1445, 1105, 765, 425 etc. These tones are utilized in the system presented by way of example as the "Space" tones of a frequency shifted signal.

Figure 4:
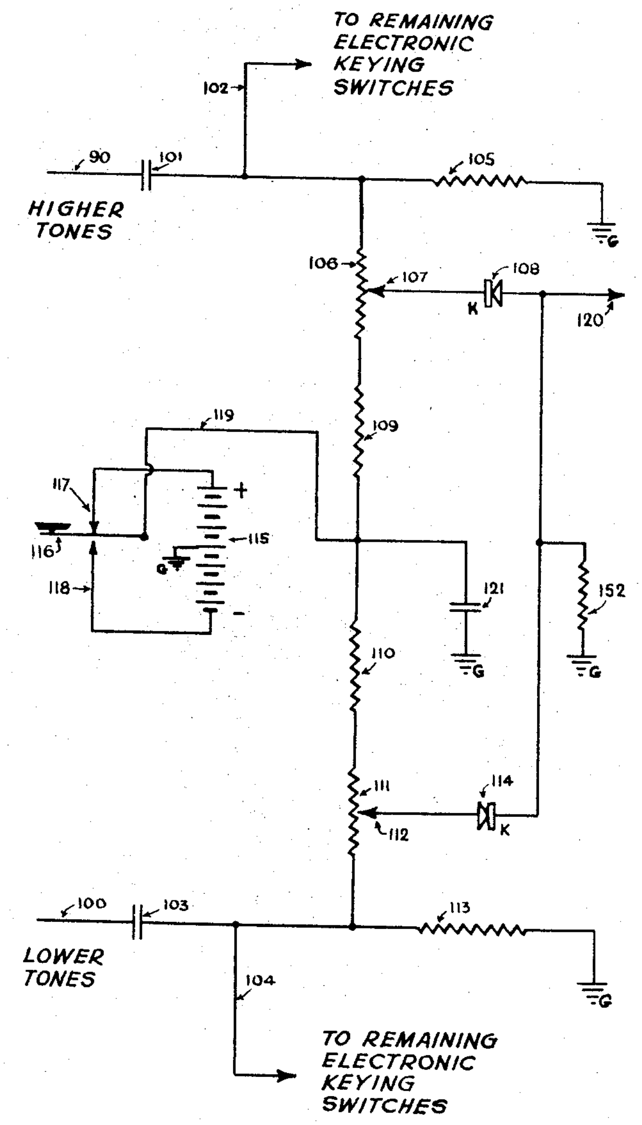
Fig. 4 shows one form of electronic keying switch and keying source which may be utilized in the present invention.

Fig. 4 shows one form of electronic keying switch and keying source which can be utilized in the present invention. The higher tones over lead 90 are applied across resistor 105 through coupling capacitor 101 and the lower tones over lead 100 are applied across resistor 113 through coupling capacitor 103. A shunt circuit is connected across resistor 105 consisting of potentiometer 106, decoupling resistor 109 and shunt capacitor 121 so that a suitable amplitude of the higher tones signal can be chosen by the setting of arm 107 and a second shunt circuit is connected across resistor 113 consisting of potentiometer 111 decoupling resistor 110 and the same shunt capacitor 121 so that suitable ampltiude of the lower tones can be chosen by the setting of arm 112. Output lead 120 is connected to arm 107 through rectifier 108 which is connected with its cathode toward arm 107 and to arm 112 through rectifier 114 which is connected with its anode toward arm 114. When either of these rectifiers is conducting the signals across the corresponding potentiometer will be passed to the output lead 120. Key 116 having an upper contact 117 connecting the positive side of battery 115 to lead 119 and a lower contact 118 connecting the negative side of battery 115 to lead 119 is utilized as a keying source. When key 116 is up a positive voltage is applied over lead 119 and through resistors 109 and 110 to potentiometers 106 and 111 and therefore to rectifiers 108 and 114. Rectifier 108 with a positive voltage on its cathode will not conduct and hence will act like an open circuit while rectifier 114 with a positive voltage on its anode will conduct and the signal voltages from the lower tones source will be conducted to output lead 120. When key 116 is pressed down, contact 118 is closed placing a negative voltage on lead 119 and hence on the cathode of rectifier 108 which becomes conductive and on anode of rectifier 114 which becomes non-conductive. Thus with key 116 down rectifier 108 conducts passing the higher tones signal to output lead 120. This keying circuit of Fig. 4 is repeated for the second, third, etc. keying source and electronic keying switch of Fig. 1 for as many as are required.

Figure 5:
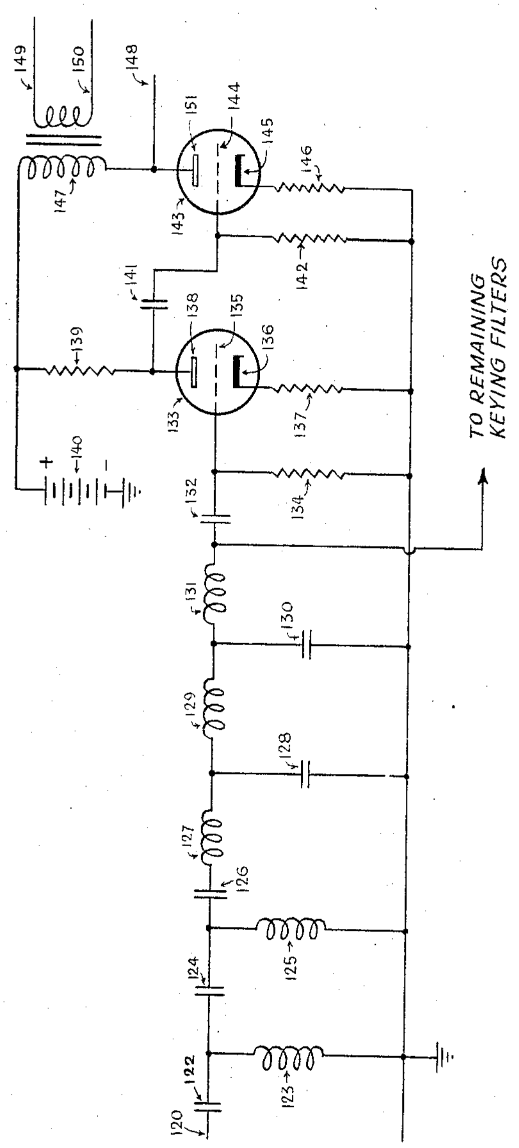
Fig. 5 shows one form of band pass filter and output amplifier suitable for use in the present invention.

Fig. 5 shows one form of band pass filter and output amplifier suitable for use in the present invention. The keyed tones received over lead 120 are passed through the band pass filter made up of the high pass portion consisting of shunt coils 123 and 125 and series capacitors 122, 124 and 126 in series with the low pass portion consisting of shunt capacitors 128 and 130 and series coils 127, 129 and 131. This band pass filter passes a band of frequencies including the particular low tone and the particular high tone making up one particular frequency shift signal as, for instance, a band of 750 to 950 to include the 765 and 935 tones making up one frequency shift signal. The filters for the other signals are chosen in a similar manner to include the two desired tones and exclude the others. This band pass filter, since it will have a finite build-up and decay time, will exclude key clicks and other spurious signals. The output passing through capacitor 132 to grid 135 of amplifier tube 133 will consist of the desired frequency shifted tones which will be shaped by the filter to transfer smoothly from one tone to the other. The shifted tones from the remaining keying filters may be applied to the same amplifier, or, if other utilization means are employed, to other amplifiers.

The filter selected and frequency shifted tones are amplified by tubes 133 and 143. They are applied to grid 135 through coupling capacitor 132 and across grid resistor 134 which also may be the impedance matching termination for the filter. Tube 133 includes cathode 136 heated by conventional means, not shown, connected by bias resistor 137 and plate 138 connected through plate load resistor 139 to a suitable plate voltage source such as battery 140. Tube 143 includes control grid 144 receiving the output from plate 138 through coupling capacitor 141 and across grid resistor 142, cathode 145 heated by conventional means, not shown, and plate 151. Cathode 145 is connected to bias resistor 146 and plate 151 is connected through primary 147 of the output transformer to battery 140. The signals thus amplified appear across secondary 148 of the output transformer and are led to further utilization means such as a radio transmitter modulator over leads 149 and 150 corresponding with the output point of 23 of Fig. 1.

Returning to Fig. 1, the system can be modified by utilizing a tone source of 85 cycles, and generating the required harmonics in generators 2 and 3. For other utilization frequencies, other source or base frequencies, such as 60 cycles can be used.

The relationship between the various frequencies of the system according to the present invention may be expressed mathematically. Assume a frequency $f_B$, which we may call the base frequency as it is a common denominator of all frequencies of the system, then the frequency of the tone source may be expressed as $nf_B$ where $n$ is a whole number and will, in general, be a number less than ten. The equivalent frequency shift, i.e. the frequency separation between the two tones constituting a pair is $mf_B$ where $m$ is an even number. The channel separation, i.e. the frequency separation between the mean frequencies of adjacent pairs of tones is $af_B$ where $a$ is an even number. The absolute value of the lowest tone in the pair of tones having the lowest mean frequency is $cf_B$ where $c$ is an odd number. With these definitions established the frequencies of the preferred embodiment set forth above have the following relationships: $a=n=2m=c-1$ and specifically $a=4$, $n=4$, $m=2$ and $c=5$.

While only one embodiment and a few modifications have been shown and described, many modifications will be apparent to those skilled in the art within the spirit and scope of the invention as set forth in the appended claims.

What I claim is:

1. In a frequency shift tone generator, the combination of, a source of tone of predetermined frequency, at least two harmonic distortion producing means to provide two groups of harmonic tones, means for selecting a predetermined tone from one of said groups, means for selecting a second predetermined tone from the other of said groups, means for combining the first said selected tone with said other of said groups to provide a first band of tones, means for combining the second said selected tone with the first of said groups to provide a second band of tones, means for keying said bands, and selecting means for deriving from said keyed bands of tones a plurality of related pairs of keyed tones in which the frequency separation between each two tones comprising a pair is equal to the frequency difference between the first two said selected tones.

2. In a system for generating pairs of frequency shift tones, the combination of, means for generating a base frequency and harmonics of said base frequency, means for selecting a first predetermined odd harmonic of said base frequency from the first said harmonics, means for selecting a second predetermined odd harmonic of said base frequency from the first said harmonics, means for generating a predetermined even harmonic of said base frequency and harmonics of said even harmonic wherein said even harmonic is equal to the mean frequency separation to be provided between pairs of frequency shifted tones to be provided, means for mixing said harmonics of said even harmonic with said first odd harmonic to provide a first group of tones, means for mixing said harmonics of said even harmonic with said second odd harmonic to provide a second group of tones, means for switching alternately said two groups of tones to a selective system, and band-pass selective means in said selective system for separating out pairs of frequency shift tones from said switched groups to provide spaced pairs of frequency shift tones.

3. In a system for generating pairs of frequency shift tones, the combination of, a tone source, means for deriving from said tone source a series of spaced tones, means for deriving from said tone source a second series of tones in which each tone in the second series is spaced by a predetermined amount from corresponding tones in said first series, means for keying the first series and the second series alternately and band-pass means for selecting pairs of tones from said keyed tones wherein the separation between each two tones in each pair is a constant predetermined frequency.

4. In a system for generating pairs of frequency shift tones, the combination of, means for generating a first series of tones having constant frequency separation, means for generating a second series of tones having the same frequency separation as said first series and spaced tone by tone from said first series, means for keying said first series alternately with said second series, and band-pass filters for separating said keyed tones to provide a plurality of pairs of keyed tones.

5. In a system for generating pairs of frequency shift tones, the combination of, a tone source, means for deriving from said tone source a series of spaced tones, means for deriving from said tone source a second series of tones in which each tone in said second series is spaced a predetermined frequency from corresponding tones in said first series, means for keying said first series and said second series alternately, and selective circuits for selecting pairs of tones from said keyed tones wherein the separation between each two tones in each pair is an integral multiple of the frequency of said tone source.

6. In a system for generating pairs of frequency shift tones, the combination of, means for generating a first series of tones having constant frequency separation, means for generating a second series of tones having the same frequency separation as said first series and spaced tone by tone from said first series means for keying said first series alternately with said second series, and selective means for separating said keyed tones into similar pairs.

7. In a system for generating pairs of frequency shift tones, the combination of a tone source, means for deriving from said tone source a series of spaced tones, means for deriving from said tone source a second series of tones in which each tone in said second series is spaced a predetermined frequency from the corresponding tones in said first series, means for keying said first series and said second series alternately, and selective circuits for selecting pairs of tones from said keyed tones wherein the frequency difference between each two tones in each pair is related to the frequency of said tone source in a whole number ratio ranging from 1:2 to less than 5:1, respectively.

8. In a system for generating pairs of frequency shift tones, the combination of, means generating a base frequency $f_B$ from a tone source having a frequency $nf_B$, at least two harmonic generators coupled to said tone source and having frequency selectors and mixers in circuit therewith deriving from said tone source a first frequency $cf_B$ and a series of frequencies harmonically related thereto separated from each other and from said frequency $cf_B$ by a frequency $af_B$, said harmonic generators, selectors, and mixers further deriving from said tone source a further series of harmonically related frequencies separated from each other by a frequency $af_B$ and spaced frequency by frequency from said first series by a frequency $mf_B$, wherein $a=n-2m-c-1$, and $c$ is an odd number.

9. In a system for generating pairs of frequency shift tones, the combination of, means generating a base frequency $f_B$ from a tone source having a frequency $nf_B$, at lease two harmonic generators coupled to said tone source and having frequency selectors and mixers in circuit therewith deriving from said tone source a first frequency $cf_B$ and a series of frequencies harmonically related thereto separated from each other and from said frequency $cf_B$ by a frequency $af_B$, said harmonic generators, selectors, and mixers further deriving from said tone source a further series of harmonically related frequencies separated from each other by a frequency $af_B$ and spaced frequency by frequency from said first series by a frequency $mf_B$, wherein $a=n=2m=4$.

References Cited in the file of this patent

UNITED STATES PATENTS

| | | |
|---|---|---|
| 1,985,046 | Marrison et al. | Dec. 18, 1934 |
| 2,235,768 | Luck | Mar. 18, 1941 |
| 2,445,664 | Doelz | July 20, 1948 |
| 2,679,006 | Doelz | May 18, 1954 |